US010528379B2

(12) United States Patent
Kristiansson et al.

(10) Patent No.: US 10,528,379 B2
(45) Date of Patent: Jan. 7, 2020

(54) ALLOCATING OR ANNOUNCING AVAILABILITY OF A SOFTWARE CONTAINER

(71) Applicant: Telefonaktiebolaget LM Ericsson (publ), Stockholm (SE)

(72) Inventors: Johan Kristiansson, Luleå (SE); Daniel Bergström, Umeå (SE); Jonas Lundberg, Luleå (SE); Nicklas Sandgren, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 87 days.

(21) Appl. No.: 15/575,424

(22) PCT Filed: Jun. 26, 2015

(86) PCT No.: PCT/SE2015/050749
§ 371 (c)(1),
(2) Date: Nov. 20, 2017

(87) PCT Pub. No.: WO2016/195562
PCT Pub. Date: Dec. 8, 2016

(65) Prior Publication Data

US 2018/0157516 A1 Jun. 7, 2018

Related U.S. Application Data

(60) Provisional application No. 62/170,264, filed on Jun. 3, 2015.

(51) Int. Cl.

*G06F 9/455* (2018.01)
*G06F 9/50* (2006.01)
*H04L 29/08* (2006.01)

(52) U.S. Cl.
CPC ........ *G06F 9/45558* (2013.01); *G06F 9/5055* (2013.01); *G06F 9/5077* (2013.01);
(Continued)

(58) Field of Classification Search
CPC .. G06F 9/45558; G06F 9/5077; G06F 9/5027; G06F 9/5055; G06F 2009/4557; H04L 67/34; H04L 67/104
See application file for complete search history.

(56) References Cited

U.S. PATENT DOCUMENTS 6,104,717 A * 8/2000 Coile .................. H01R 31/005 370/352
7,822,860 B2 * 10/2010 Brown .................... H04L 29/06 707/609

(Continued)

FOREIGN PATENT DOCUMENTS

WO WO 2013/106257 A1 7/2013
WO WO 2014/171810 A2 10/2014

OTHER PUBLICATIONS

Communication Pursuant to Article 94(3) EPC for European patent application No. EP 15 733 943, dated Nov. 16, 2018, 6 Pages.

(Continued)

*Primary Examiner* — Benjamin C Wu
(74) *Attorney, Agent, or Firm* — Sage Patent Group

(57) ABSTRACT

It is provided a method for allocating a software container executing on a server of a set of servers. The method is performed in a container allocator and comprising the steps of: receiving a request to invoke a software container for a client; calculating a lookup key associated with the software container; performing a lookup in a distributed peer-to-peer repository using the lookup key, giving a result set of active software containers; selecting one software container from the set of software containers; and connecting to the selected
(Continued)

software container to allocate the selected software container to the client.

9 Claims, 4 Drawing Sheets

(52) U.S. Cl.
CPC ...... *H04L 67/34* (2013.01); *G06F 2009/4557* (2013.01); *H04L 67/104* (2013.01)

(56) References Cited

U.S. PATENT DOCUMENTS

| | | | | |
|---|---|---|---|---|
| 8,176,486 | B2 | 5/2012 | Husain | |
| 2005/0243740 | A1* | 11/2005 | Chen | H04L 67/2804 370/256 |
| 2008/0201414 | A1* | 8/2008 | Amir Husain | G06F 9/445 709/203 |
| 2010/0083251 | A1* | 4/2010 | McCrory | G06F 9/455 718/1 |
| 2012/0151477 | A1 | 6/2012 | Sinha et al. | |
| 2012/0179778 | A1 | 7/2012 | Deswardt et al. | |
| 2014/0280433 | A1 | 9/2014 | Messerli et al. | |
| 2014/0282413 | A1* | 9/2014 | Grimme | G06F 8/60 717/124 |
| 2016/0092252 | A1* | 3/2016 | Wagner | G06F 9/45533 718/1 |
| 2017/0264493 | A1* | 9/2017 | Cencini | H04L 41/044 |
| 2019/0146833 | A1* | 5/2019 | Kristiansson | G06F 9/485 |

OTHER PUBLICATIONS

Mark F Mergen et al, Virtualization for high-performance computing, Operating Systems Review, ACM, New York, NY, US, vol. 40, No. 2, Apr. 1, 2006, XP058211111, pp. 8-11.

Moniruzzaman A B M et al, Virtual Memory Streaming Technique for virtual machines (VMs) for rapid scaling and high performance in cloud environment, 2014 International Conferences on Informatics, Electronics & Vision (ICIEV), IEEE, May 23, 2014, XP032616217, pp. 1-6.

International Search Report and Written Opinion of the International Searching Authority, International Application No. PCT/SE2015/050749, dated Jan. 29, 2016, 9 pages.

Chunyl, P., et al., "VDN: Virtual Machine Image Distribution Network for Cloud Data Centers," (XP032178917) INFOCOM, 2012 Proceedings IEEE, IEEE, Mar. 25, 2012 pp. 181-189.

Rajiv, R., et al., "Peer-to-Peer Cloud Provisioning: Service Discovery and Load-Balancing," (XP080381624) arxiv.org, Cornell University Library, Dec. 10, 2009, 27 pages.

Dua, R., et al., "Virtualization vs Containerization to Support PaaS," (XP032647689) 2014 IEEE International Conference on Cloud Engineering, Mar. 11, 2014, pp. 610-614.

"Apache Mesos," Apache Mesos—Wikipedia [online document—last edited Oct. 30, 2017] Downloaded from the Internet Nov. 7, 2017, <URL https://en.wikipedia.org/wiki/Apache_Mesos>, 4 pages.

"Docker (Software)" Docker (Software)—Wikipedia [online document—last edited Mar. 7, 2015] Downloaded from the Internet Nov. 7, 2017, <URL https://en.wikipedia.org/w/index.php?title=Docker_(software)&oldid=650283834>, 5 pages.

Stoica, I., "Chord: A Scalable Peer-to-Peer Lookup Service for Internet Applications," Proceedings of the 2001 SIGCOMM Conference, Oct. 2001, vol. 31, Issue 4, 12 pages.

Maymounkov, P., et al., "Kademlia: A Peer-to-Peer Information System Based on the XOR Metric," Proceedings of the 2002 IPTPS Conference, Oct. 10, 2002, 13 pages.

Rowstron, A., et al., "Pastry: Scalable, Decentralized Object Location and Routing for Large-Scale Peer-to-Peer Systems," Proceedings of the 18$^{th}$ IFIP/ACM Int'l Conference on Distributed Systems Platforms (Middleware 2001) Nov. 2001, 22 pages.

"Tuple Space," Tuple Space—Wikipedia [online document—last edited Oct. 14, 2017] Downloaded from the Internet Nov. 7, 2017, <URL https://en.wikipedia.org/wiki/Tuple_space> 5 pages.

Pendry, J.-S., et al., "Union Mounts in 4.4BSD-lite," Proceedings of the USENIX 1995 Technical Conference, Jan. 16-20, 1995, 12 pages.

* cited by examiner

ALLOCATING OR ANNOUNCING AVAILABILITY OF A SOFTWARE CONTAINER

CROSS REFERENCE TO RELATED APPLICATIONS

This application is a 35 U.S.C. § 371 national stage application of PCT International Application No. PCT/SE2015/050749 filed on Jun. 26, 2015, which in turns claims domestic priority to U.S. Provisional Patent Application No. 62/170,264, filed on Jun. 3, 2015, the disclosures and content of which are incorporated by reference herein in their entirety.

TECHNICAL FIELD

The invention relates to methods, a container allocator, a server, computer programs and computer program products for allocating a software container or announcing availability of a software container.

BACKGROUND

Recently, microservices have become a popular architecture to build modern Web services. By breaking down a complex monolithic application into small independent services it becomes possible to develop services that are more resilient to error and more scalable. For example, if a particular microservice would fail, it would not affect the entire service. However, if a component part of a monolithic service would fail, the entire service would have to be restarted. Also, the only way to scale a monolithic service is to duplicate the whole monolith by adding more instances of it. In a microservice based architecture on the other hand, only the services that need to be scaled need to be duplicated.

Software containers are commonly used to implement microservice-based architectures and make sure services can run independently of each other. In contrast to virtual machines, software containers are more lightweight and can instantly be started, similar to standard Unix processes, assuming the server has all images required to start the container. Another advantage is that software containers provide a reliable execution environment allowing developers to develop and test their services locally on their machine and then upload the image to a cloud platform and still be sure the containers behave similarly as running them locally.

Docker is an example of a container runtime that has recently gained popularity. By allowing container images to be stacked in a so-called union file system, container images can more efficiently be distributed.

However, when adopting a microservice based container architecture, designers and developers still need to figure out how to manage the life cycle of individual components, for example when to start a new service, when to scale it, how to handle fault recovery and so on.

Additionally, a general problem with current container based architectures is that it takes time to start new containers. This is particularly a problem when using cluster management platforms such as Apache Mesos where the start-up delay can vary from a couple of seconds up to several minutes depending if the selected server in the cluster already has the necessary container images required to start the container in local storage or not. Without taking precautionary actions, a fresh new server added to the cluster has typically no container images at all, and will thus cause a significant delay. Also, finding a suitable server in the cluster for running the container as well as starting it up adds to the delay.

From a user perspective, the service should start without noticeable delay or at least with acceptable delay. To give a perspective, a common practice is to minimize the size of JavaScript code loaded by Web browser to more quickly start a Web application. Waiting several minutes for deploying a container would in many cases not be a practical solution. Consequently, adopting a design principle where containers are started on demand would not be possible in such a case.

SUMMARY

It is an object to enable lower start-up times for software containers. According to a first aspect, it is provided a method for allocating a software container executing on a server of a set of servers. The method is performed in a container allocator and comprising the steps of: receiving a request to invoke a software container for a client; calculating a lookup key associated with the software container; performing a lookup in a distributed peer-to-peer repository using the lookup key, giving a result set of active software containers; selecting one software container from the set of software containers; and connecting to the selected software container to allocate the selected software container to the client.

According to a second aspect, it is provided a container allocator configured to allocate a software container executing on a server of a set of servers. The container allocator comprises: a processor; and a memory storing instructions that, when executed by the processor, cause the container allocator to: receive a request to invoke a software container for a client; calculate a lookup key associated with the software container; perform a lookup in a distributed peer-to-peer repository using the lookup key, giving a result set of active software containers; select one software container from the set of software containers; and connect to the selected software container to allocate the selected software container to the client.

According to a third aspect, it is provided a container allocator comprising: means for receiving a request to invoke a software container for a client; means for calculating a lookup key associated with the software container; means for performing a lookup in a distributed peer-to-peer repository using the lookup key, giving a result set of active software containers executing on respective servers of a set of servers; means for selecting one software container from the set of software containers; and means for connecting to the selected software container to allocate the selected software container to the client.

According to a fourth aspect, it is provided a computer program for allocating a software container executing on a server of a set of servers. The computer program comprises computer program code which, when run on a container allocator cause the container allocator to: receive a request to invoke a software container for a client; calculate a lookup key associated with the software container; perform a lookup in a distributed peer-to-peer repository using the lookup key, giving a result set of active software containers; select one software container from the set of software containers; and connect to the selected software container to allocate the selected software container to the client.

According to a fifth aspect, it is provided a computer program product comprising a computer program according to the fourth aspect and a computer readable means on which the computer program is stored.

According to a sixth aspect, it is provided a method for announcing availability of a software container. The method is performed in a server, and comprises the steps of: initialising execution of the software container in the server; calculating a lookup key associated with the software container; storing an address of the server in association with the lookup key in a distributed peer-to-peer repository; receiving a connection request to allocate the software container to a client; and transmitting an allocation acceptance message.

According to a seventh aspect, it is provided a server configured to announce availability of a software container. The server comprises: a processor; and a memory storing instructions that, when executed by the processor, cause the server to: initialise execution of the software container in the server; calculate a lookup key associated with the software container; store an address of the server in association with the lookup key in a distributed peer-to-peer repository; receive a connection request to allocate the software container to a client; and transmit an allocation acceptance message.

According to an eighth aspect, it is provided a server comprising: means for initialising execution of a software container in the server; means for calculating a lookup key associated with the software container; means for storing an address of the server in association with the lookup key in a distributed peer-to-peer repository; means for receiving a connection request to allocate the software container to a client; and means for transmitting an allocation acceptance message.

According to a ninth aspect, it is provided a computer program for announcing availability of a software container, the computer program comprises computer program code which, when run on a server cause the server to: initialise execution of the software container in the server; calculate a lookup key associated with the software container; store an address of the server in association with the lookup key in a distributed peer-to-peer repository; receive a connection request to allocate the software container to a client; and transmit an allocation acceptance message.

According to a tenth aspect, it is provided a computer program product comprising a computer program according to the ninth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
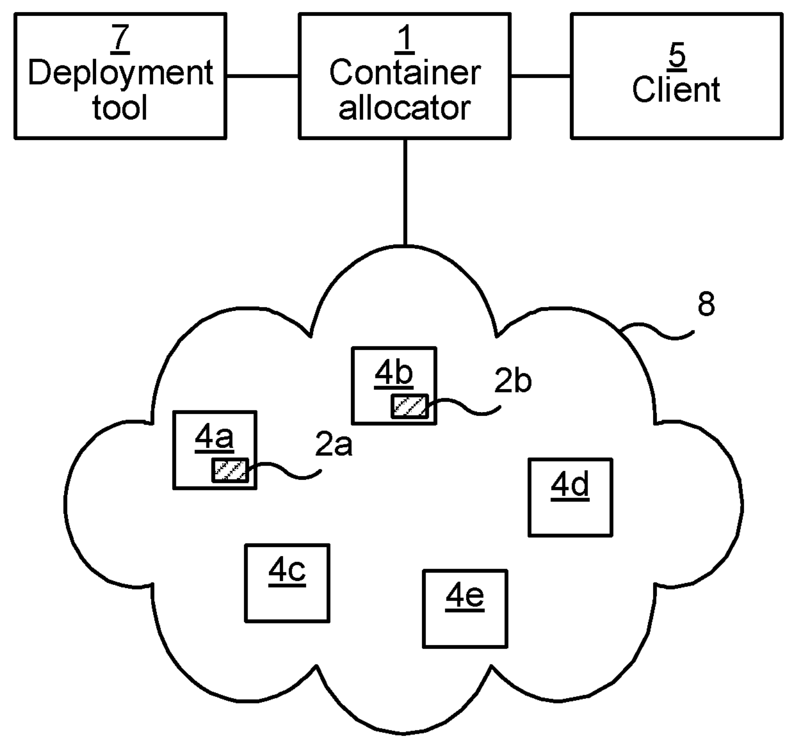
FIG. 1 is a schematic drawing illustrating an environment in which embodiments presented herein can be applied.

FIG. 1 is a schematic drawing illustrating an environment in which embodiments presented herein can be applied.

There are here a number of servers 4*a-e* forming part of a set 8 of servers. While there are five servers 4*a-e* shown here, the set 8 of servers can contain any suitable number of servers. Each one of the servers 4*a-e* can execute software containers when required, as described in more detail below.

For instance, the software containers can be containers running on a Docker platform. The software containers are distributed as images being files (images are here not to be confused with illustrations/photographs).

Moreover, a method called process injection is used to transparently add additional processes into the container and then modify the boot order. This makes it possible to inject management processes into the containers, for example service composition processes allowing containers to self-configure.

Here, process injection can be used to inject a process for an allocation agent in the software container. The allocation agent communicates with a container allocator 1 to assist in the allocation of software containers to one or more clients 5. Each client 5 here at some point wants to make use of a software container. It is to be noted that each client can also be a server for another context; it is only in relation to a software container described here that the client 5 is a client.

A deployment tool 7 is used when new software containers are to be deployed. The deployment tool 7 communicates with the container allocator 1 for the deployment.

The set of servers 8 is organised in a decentralized peer-to-peer network, which can be implemented on an underlying network, such as an IP (Internet Protocol) network. Some of the software containers in the network are active but not allocated to any clients. The active but not allocated containers can be discovered by clients using the container allocator 1 such that once they have been discovered it is ensured that the software container is not allocated multiple times by other clients. Since the containers are already active, i.e. executing, the start up time when a client requests a software container is minimal. This mechanism makes it possible to implement transient containers, which are containers allocated on demand to clients and only exist for a limited amount time.

Once the client 5 releases communication with the server, the execution of the software container ends. Each software container is here an instance of a software image. Using the peer-to-peer network, the presented embodiment is decentralized; meaning that there is no directory service or central controller that is responsible for allocation. Every server in the network is equal, and it is the network itself, which provides the proposed discovery mechanism to allocate containers. Hence, there may be several container allocators 1 executing in parallel for the same set of servers 8.

To provide the decentralized solution, the proposed discovery algorithm can be based on a Distributed Hash Table (DHT) algorithm, such as Kademlia, Chord or Pastry.

The allocation agent which is injected at deployment connects to the peer-to-peer network 8 and publishes a checksum (e.g. SHA (Secure Hash Algorithm)–1) of a blueprint for the software container and information how to connect to the allocation agent. The blueprint contains information such or metadata of the image, e.g.: {"container": {"image": "docker:///sampledockerregistry.foo.com:443/videoconf"}}, here containing container image(s) URL, etc. needed to start the container. The blueprint may optionally contain additional metadata, such as version numbers or memory or CPU constraints. The blueprint may also be a reference, a checksum (such as Secure Hash Algorithm 1 (SHA-1)) or a other identifier (e.g. UUID) as long as the underlying system can resolve the identifier and retrieve information on how to deploy the containers.

When a client 5 needs the services of a software container executing a particular functionality (provisioned by the software image), the container allocator calculates the checksum (being a lookup key) of a blueprint of the requested image and performs a lookup of the checksum in the peer-to-peer repository implemented e.g. by the DHT. In this way, the container allocator discovers the allocation agents of the software containers matching the specified blueprint. The container allocator 3 then randomly selects an allocation agent and tries to connect to it. An allocation agent will only accept one single connection during its lifetime, and a container is successfully allocated to a particular client 5 if the Container Allocator managed to connect to the selected Allocation Agent.

Different instances of the same software container can execute in parallel on different servers to thereby achieve transient containers. In FIG. 1, a first software container **2*a* is a pre-started instance of a particular image executing on a first server 4*a*. In parallel, a second software container 2*b* is a pre-started instance executing on a second server 4*b*. The second software container 2*b* is an instance of the same image which is used for the first software container 2*a***. Hence, their blueprints are the same and their checksums are the same.

This structure allows the use of transient containers, where software containers are allocated on demand, for example triggered by an external event such as a user loads a particular web page (URL).

The client 5 can be any suitable type of client. One non-limiting example is that the client 5 could be a client for a communication session, e.g. in accordance with Matrix.org which is an open standard for a protocol that can be used to set up communication sessions, where each session corresponds to an online virtual room. When users enter a virtual room (e.g. by opening a URL in a web browser) they will join the meeting or conference to meet other participants connected to the same room.

An interesting characteristic of an online virtual room is that resources connected to room (e.g. a video conferencing service or a data synchronization service) only needs to be allocated as long as there are participating users. Using the structure provided here, all needed resources can be allocated on demand, for example by starting all needed containers when the first user join the room, and then stop all containers when all users have left. The concept of transient containers could therefore be an efficient design principle for implementing online video conferencing services.

Using the embodiment of FIG. 1, it is possible to more or less instantly start containers, and it is thus possible to use transient containers as a design pattern to more efficiently implement new Internet services and applications.

As a container is created on demand when needed and only exists for a limited time, it is very easy to scale a service by adding more hardware, for example adding more servers to the set of servers 8 (peer-to-peer network). This architecture supports great scalability and can support massive amounts of servers.

If a transient container crashes, it will not affect the entire service, but only the clients connected to the container that crashed are affected. Also, as the containers are never reused, a client will always connect to a fresh instance. This eliminates effects of software bugs such as memory leaks that could otherwise drain computational resources over time.

As transient containers are shutdown after being used, all states stored in the container are lost, making it harder to hack the system to retrieve historical data.

It becomes possible to introduce a new version of particular container without affecting previously running sessions, e.g. a videoconference session. The videoconference session will eventually be upgraded once all users have left the conference and then join the same conference room at a later occasion. Also, all new conference sessions will immediately start using the new containers images once they have been introduced. Again, this will not affect already running sessions.

Figure 2:
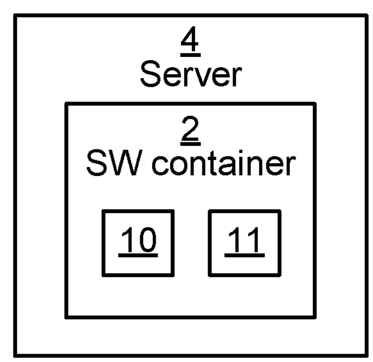
FIG. 2 is a schematic drawing illustrating a server shown in FIG. 1.

FIG. 2 is a schematic drawing illustrating a server 4 shown in FIG. 1. The server 4 can be any of the servers **4*a-e* shown in FIG. 1**.

The server 4 comprises one or more software containers 2. Each software container is an instance of an image and contains, apart from its operative software, an allocation agent 11, injected at deployment and a peer-to-peer repository 10. The peer-to-peer repository is implemented e.g. using DHT as described above.

Each software container can be active and not allocated, active and allocated or not running. Each software container 2 can be allocated to only one session (or client) and after the client releases the software container, the execution of the software container 2 ends and is not started again. However, the server can start a new software container 2 being an instance of the same or a different image.

Now an embodiment of the peer-to-peer network for the servers will be described based on Bitverse. Bitverse is a framework to build decentralized peer-to-peer application. Bitverse is based on the Kademlia DHT algorithm and provides a messaging API (Application Programming Interface) and a key value store API. In both APIs, self-generated SHA-1 strings are used to identify node end-points and data objects. Bitverse is thus a DHT implementation of a decentralised repository.

Bitverse consists of two different types of nodes, super nodes and edge nodes. Edge nodes are connected using web sockets to a super node and thus forms a star topology. An edge node can either run as a library in a web browser client or in a server component directly.

Super nodes communicate using UDP (User Datagram Protocol). Messages are routed using a routing table provides by Kademlia. The routing table consists of 160 buckets where each bucket contains a limited list of contacts (typically 20) discovered by the super node. XOR (Exclusive OR) is used to determine the distance between two different nodes in the network and which bucket a contact should be stored in. This makes it possible to implement an iterative protocol where a node calculates which contacts in its routing table that has the shortest distance to a particular string, or the SHA-1 of the string to be more specific. These contact are then queries until there are no more nodes to query. This makes it possible to find the nodes in the whole network that has the shortest distance to a particular string. Like all DHTs, this procedure is very efficient, typically O(log n) messages need to be sent, where is n is the number of nodes in the network and O denotes order.

By calculating a SHA-1 of the key it becomes possible to calculate which nodes in the network a particular key-value pair should be stored, and thus implement a distributed data repository where data is replicated in the network. In Bitverse, the value is represented as an unordered set, which makes it possible to store multiple values associated with a specific key. This special key-value(s) pair is called a SetMap. Below is an example of SetMap storing 5 values, identified by the key "hello".

"hello"=>{value2, value1, value5, value4, value3}

The SetMap provides a simple API, for example setmap=bitverse.getSetMap("hello")

setMap.AddValue("value6")

The SetMap API can be used by the allocation agents to store registration data for a software container. The SetMap is also used internally in Bitverse to provide a messaging service. When an edge node connects to a super node, the super node will store IP number and UDP port of the super node as a value in a SetMap, where the self-generated SHA-1 id of the edge node is used as a key. This makes it possible for an edge node to send messages to any other edge node in the network, by allow the super nodes to use the information stored in the SetMap to set up tunnels between different super nodes.

Below is an example of a messaging API call to send a message to an edge node, where 4cd7e1804bad563d32a416df5f915efbb013ee6f is the address of the receiving edge node.

bitverse.sendMessage ("4cd7e1804bad563d32a416df5f9g15efbb013ee6f", "hello")

The message will then be sent to the connected super node, which will if necessary tunnel the message to a foreign super node where the receiving edge node is connected.

As used herein, the lookup key can be the checksum of the blueprint of a software container and the values are the Bitverse edge node addresses to the injected allocation agents executing on servers. Note that it would also be possible to use regular TCP or UDP to communicate with the allocation agents. Also, to authenticate the container allocator, in one embodiment, the container allocator uploads a public key to the allocation agents and signs outgoing messages from the container allocator.

Figures 3A, 3B:
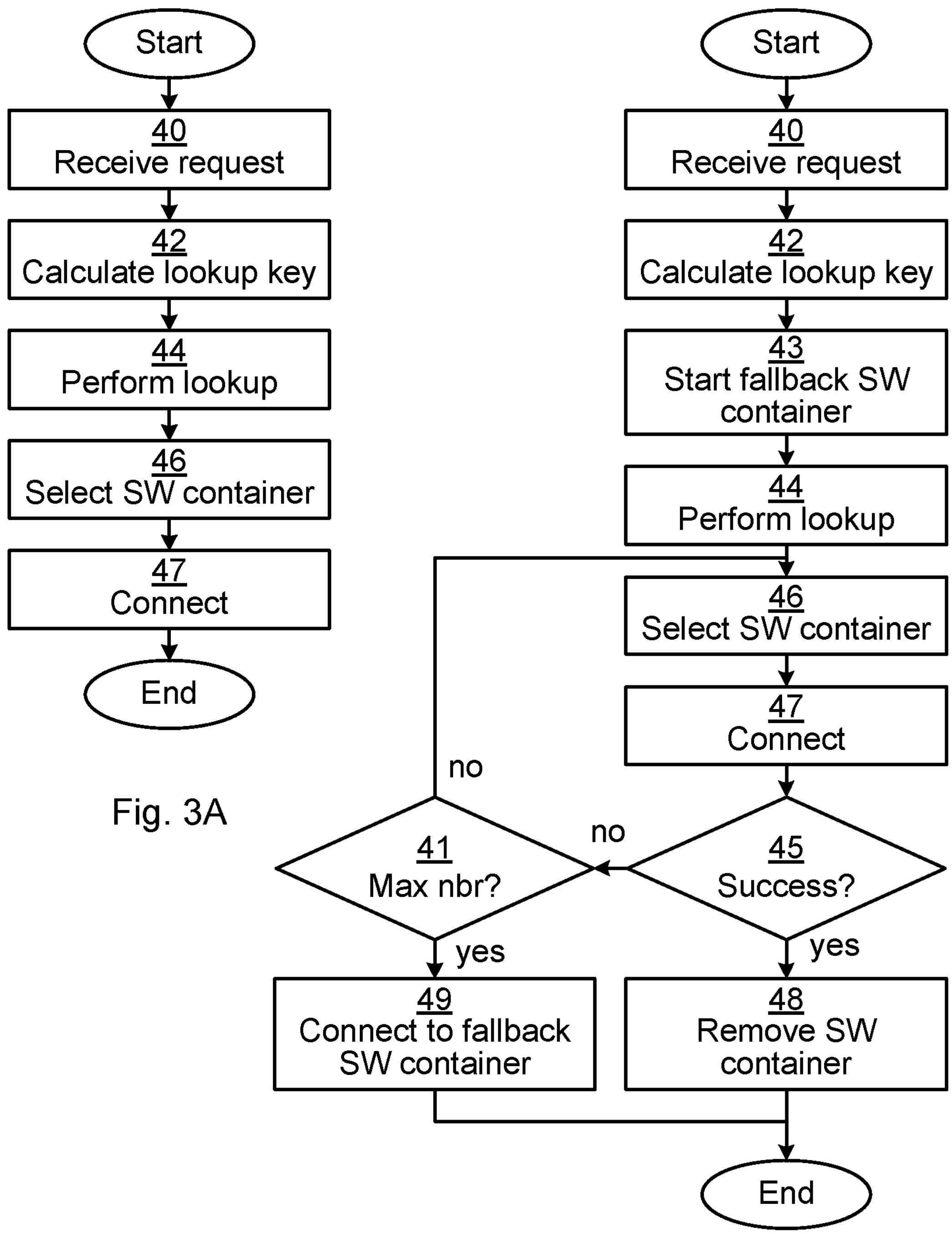
FIGS. 3A-B are flow charts illustrating embodiments of methods for allocating a software container.

FIGS. 3A-B are flow charts illustrating embodiments of methods for allocating a software container. The method is performed in a container allocator. First the method illustrated by FIG. 4A will be described.

In a receive request step 40, a request to invoke a software container for a client is received. The request can be received from the client.

In a calculate lookup key step 42, a lookup key associated with of the software container is calculated. The lookup key can e.g. be a checksum of a blueprint for the software container as described above. The blueprint can include or consist of metadata for the software container.

In a perform lookup step 44, a lookup is performed in a distributed peer-to-peer repository using the lookup key. This gives a result set of active software containers. The set can contain zero, one or more active software containers, or more accurately references to the zero, one or more active software containers. The distributed repository may be based on a distributed hash table.

When SetMap is used as described above, the perform lookup can be performed like the following example:

allocationSet=bitverse.getSetMap ("4520fbc78612aeb22f53f156a4a259295216fcfa")

where the string between the quotes is the lookup key. In our example, this can give the result of two Bitverse edge node addresses:

c724188d998c768c5ddda850ac3064a3fc623864, and c8ea48d7168cb107a161d7f5bd7277a02344bb82.

In a select SW container step 46, one software container (or its allocation agent) is selected from the set of software containers. The choice can e.g. be a random (or pseudo-random) selection from the set of software containers.

For instance, the software container with address c8ea48d7168cb107a161d7f5bd7277a02344bb82 could be selected in our example.

In a connect step 47, the container allocator connects to the selected software container to allocate the selected software container to the client. For example, the container allocator can connect to an allocation agent having been injected in the software container.

At this point, the client and the software container can communicate and use each other's functionality. Optionally, the client connects through the container allocator and does not know the exact location or IP (Internet Protocol) address of the server running the software container.

Looking now to FIG. 3B, only new or modified steps compared to the method illustrated by the flow chart of FIG. 3A will be described.

In an optional start fallback SW container step 43, a fallback software container is started in a server of the set of servers. Optionally, several fallback software containers can be started in one or more of the servers.

In an optional conditional success step 45, it is determined when the software container is successfully allocated to the client. If this is the case, the method proceeds to a remove SW container step 48. Otherwise, the method proceeds to an optional conditional max nbr step 41, or when that step is not performed, to an optional connect to fallback SW container step 49. The determination of success is particularly useful when there are several container allocators using the same peer-to-peer network, in which another container allocator could allocate the selected software container between the selection in step 46 and a confirmed connection in step 47. The success can be based on signalling received from the server based on the connect step 47.

In the optional conditional max nbr step 41, it is determined whether a maximum number of attempts of connecting have been performed. If this is the case, the method proceeds to the connect to fallback SW container step 49. Otherwise, the method returns to the select SW container step 46 to select a new SW container to attempt to connect to. In other words, a software container is determined to fail to be allocated to the client when none of the instances of connecting to the selected software container results in a successful allocation to the client.

In an optional remove SW container step 48, the allocated software container is removed from the repository. This prevents any other client from being allocated the software container which has just successfully been allocated to the client. It is only possible to connect once to a software container.

In an optional connect to fallback SW container step 49, the container 10*o* allocator connects to the fallback software container to allocate the fallback software container to the client. This was started in step 43 and has had some time to initialise, whereby any delay experienced by the client is reduced compared to starting a software container at this point.

Optionally, a separate process checks if the number of containers in the distributed peer-to-peer repository is below a certain threshold and then pre-start new containers if that is the case. It would also be possible to develop a decentralized algorithm executed by each container to self-replicate the containers to make sure there are enough instances in the repository.

After this method is performed, the client can connect to the software container. One embodiment could be that the container allocator receives connection information when connecting to a software container how to further connect to a process (such as a Unix process) running inside the container. Another embodiment could be to develop a rendezvous protocol, for example using a Bitverse SetMap to discover the allocated container.

Figure 4A:
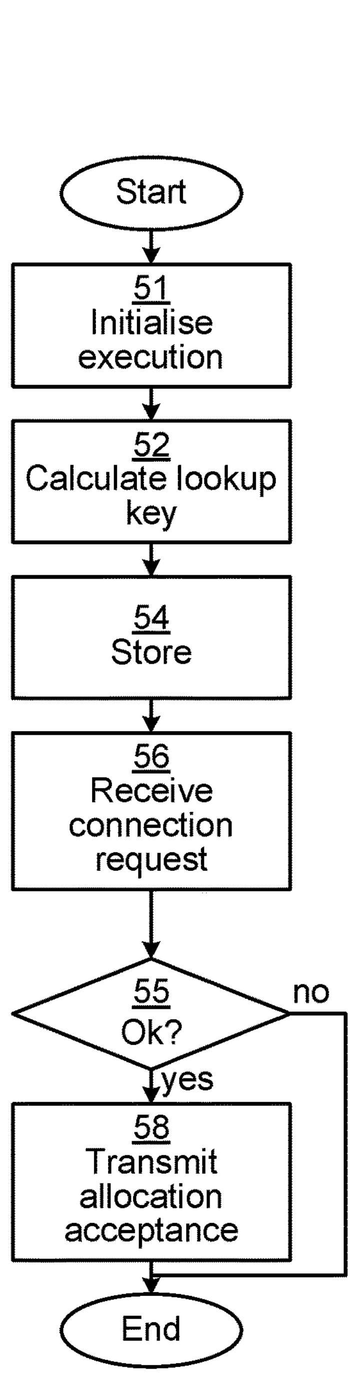
FIGS. 4A-B are flow charts illustrating embodiments of methods for announcing availability of a software container.
Figure 4B:
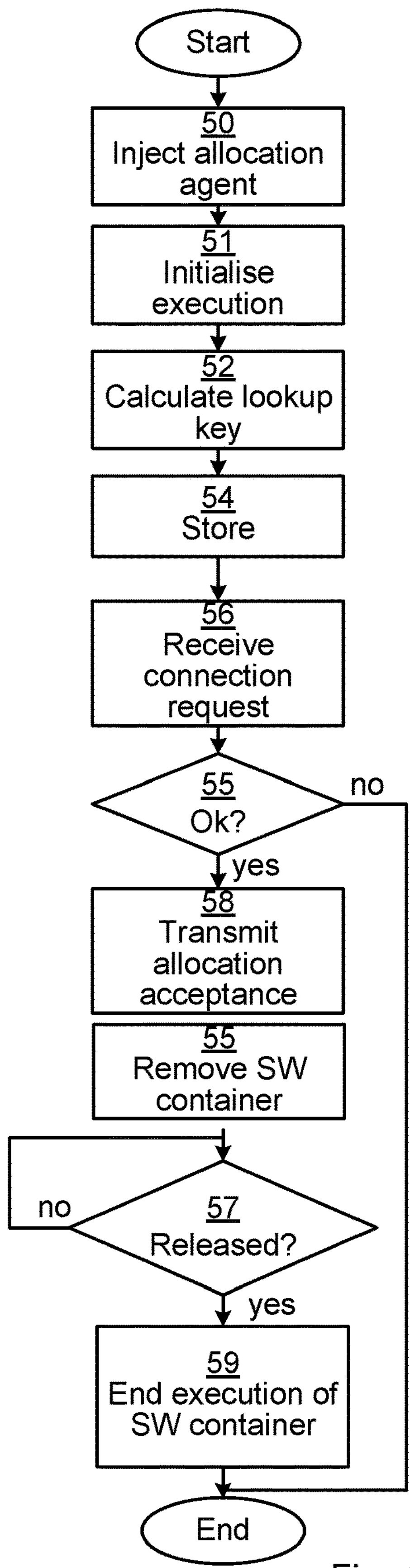

FIGS. 4A-B are flow charts illustrating embodiments of methods for announcing availability of a software container. The method is performed in a server such as one or all of the servers of FIG. 1.

In an initialise execution step 51, execution of the software container is initialised in the server. This can be triggered by the server or from signalling from another node, such as the container allocator.

In a calculate lookup key step 52, a lookup key associated with the software container is calculated. This step corresponds to step 42 of FIGS. 3A-B.

In a store step 54, an address of the server is stored in association with the lookup key in a distributed peer-to-peer repository. This allows the server to be located based on the lookup key. At this stage, the software container has been started but not allocated to a client.

In a receive connection request step 56, a connection request to allocate the software container to a client is received. This can be received from the container allocator.

In a conditional ok step 55, the server determines whether to grant the connection request. For instance, each software container can only be allocated once, whereby the connection request is only granted if the software container in question has not been allocated at this time. If the connection request is granted, the method proceeds to a transmit allocation acceptance step 58. Otherwise, the method ends.

In the transmit allocation acceptance step 58, an allocation acceptance message is transmitted, e.g. to the container allocator. This can be sent to the container allocator. This indicates success of the allocation to the recipient.

Looking now to FIG. 4B, only new or modified steps compared to the method illustrated by the flow chart of FIG. 4A will be described.

In an optional inject allocation agent step 50, an allocation agent is injected in the software container. The allocation agent is a software process configured to perform all following steps of the method.

In an optional remove SW container step 55, the allocated software container (or more specifically the reference to it) is removed from the repository.

In an optional conditional released step 57, it is determined whether the software container has been released, i.e. when it is not needed by any client any more. When this is the case, the method proceeds to an optional end execution of SW container step 59. Otherwise, the method re-executes this step, optionally after a delay (not shown).

In the optional end execution of SW container step 59, the execution of the software container ends. This ends the lifetime of the software container, forming part of the transient container concept.

Figure 5:
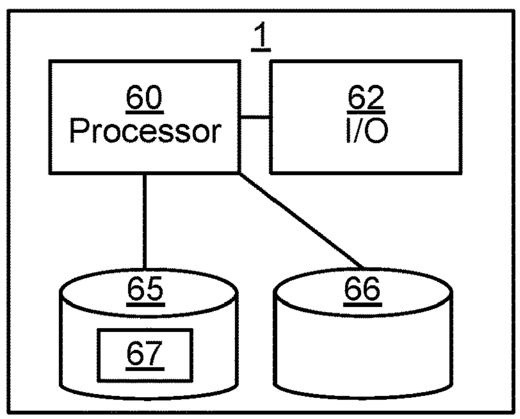
FIG. 5 is a schematic diagram illustrating components of the container allocator of FIG. 1.

FIG. 5 is a schematic diagram illustrating components of the container 10*o* allocator 1 of FIG. 1. A processor 60 is provided using any combination of one or more of a suitable central processing unit (CPU), multiprocessor, microcontroller, digital signal processor (DSP), application specific integrated circuit etc., capable of executing software instructions 67 stored in a memory 65, which can thus be a computer program product. The processor 60 can be configured to execute the method described with reference to FIGS. 3A-B above.

The memory 65 can be any combination of read and write memory (RAM) and read only memory (ROM). The memory 65 also comprises persistent storage, which, for example, can be any single one or combination of magnetic memory, optical memory, solid state memory or even remotely mounted memory.

A data memory 66 is also provided for reading and/or storing data during execution of software instructions in the processor 60. The data memory 66 can be any combination of read and write memory (RAM) and read only memory (ROM).

The container allocator 1 further comprises an I/O interface 62 for communicating with other external entities. Optionally, the I/O interface 62 also includes a user interface.

Other components of the container allocator 1 are omitted in order not to obscure the concepts presented herein.

Figure 6:
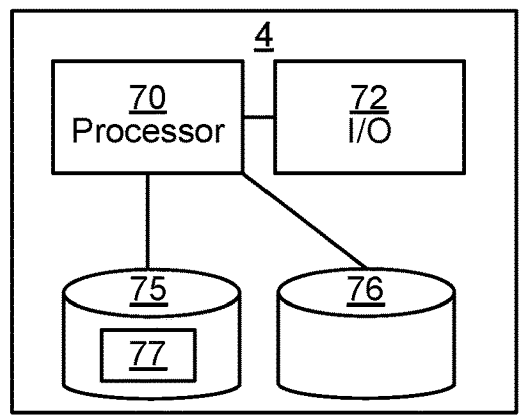
FIG. 6 is a schematic diagram illustrating components of the servers of FIG. 1.

FIG. 6 is a schematic diagram illustrating components of the each one of the servers 4 of FIG. 1, here represented by a single server 4. A processor 70 is provided using any combination of one or more of a suitable central processing unit (CPU), multiprocessor, microcontroller, digital signal processor (DSP), application specific integrated circuit etc., capable of executing software instructions 77 stored in a memory 75, which can thus be a computer program product. The processor 70 can be configured to execute the method described with reference to FIGS. 4A-B above.

The memory 75 can be any combination of read and write memory (RAM) and read only memory (ROM). The memory 75 also comprises persistent storage, which, for example, can be any single one or combination of magnetic memory, optical memory, solid state memory or even remotely mounted memory.

A data memory 76 is also provided for reading and/or storing data during execution of software instructions in the processor 70. The data memory 76 can be any combination of read and write memory (RAM) and read only memory (ROM).

The server 4 further comprises an I/O interface 72 for communicating with other external entities. Optionally, the I/O interface 72 also includes a user interface.

Other components of the server 4 are omitted in order not to obscure the concepts presented herein.

Figure 7:
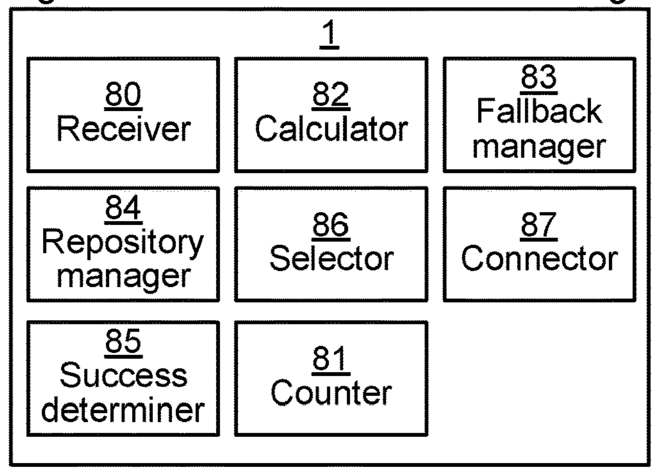
FIG. 7 is a schematic diagram showing functional modules of the container allocator of FIG. 5 according to one embodiment.

FIG. 7 is a schematic diagram showing functional modules of the container allocator 1 of FIG. 5 according to one embodiment. The modules are implemented using software instructions such as a computer program executing in the container allocator 1. The modules correspond to the steps in the methods illustrated in FIGS. 3A and 3B.

A receiver 80 corresponds to step 40.

A calculator 82 corresponds to step 42.

A fallback manager 83 corresponds to step 43.

A repository manager 84 corresponds to step 44 and step 48.

A selector 86 corresponds to step 46.

A connector 87 corresponds to step 47 and step 49.

A success determiner 85 corresponds to step 45.

A counter 81 corresponds to step 41.

Figure 8:
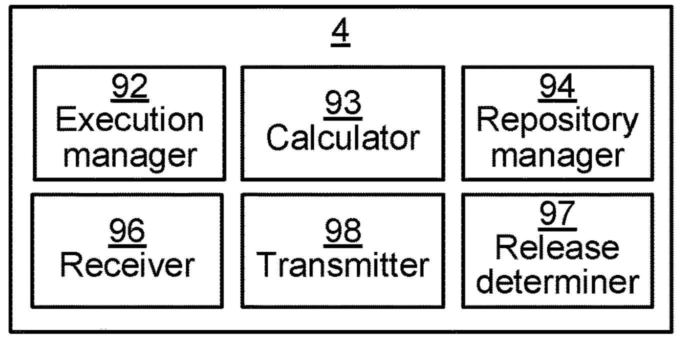
FIG. 8 is a schematic diagram showing functional modules of the server of FIG. 6 according to one embodiment.

FIG. 8 is a schematic diagram showing functional modules of the server 4 of FIG. 6 according to one embodiment. The modules are implemented using software instructions such as a computer program executing in the server 4.

The modules correspond to the steps in the methods illustrated in FIGS. 4A and 4B.

An execution manager 92 corresponds to step 50, step 51 and step 59.

A calculator 93 corresponds to step 52.

A repository manager 94 corresponds to step store 54.

A receiver 96 corresponds to step 56.

A transmitter 98 corresponds to 58.

A release determiner 97 corresponds to 57.

Figure 9:
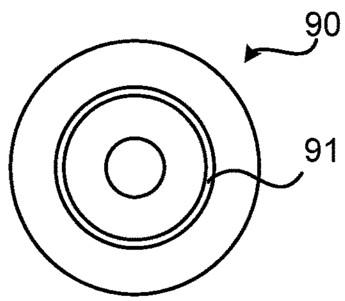
FIG. 9 shows one example of a computer program product comprising computer readable means.

FIG. 9 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 67 of FIG. 5 or 77 of FIG. 6. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for allocating a software container executing on a server of a set of servers, the method being performed in a container allocator and comprising:

receiving a request to invoke the software container for a client;

calculating a lookup key associated with the software container;

starting a fallback software container in the server of the set of servers to allocate to the client responsive to failing to allocate the software container to the client;

performing a lookup in a distributed repository using the lookup key, giving a result set of software containers that are active, the distributed repository being a distributed peer-to-peer repository;

selecting one software container from the result set of software containers;

connecting to the one software container to allocate the one software container to the client; and responsive to the one software container failing to be allocated to the client, connecting to the fallback software container that was previously started to allocate the fallback software container to the client.

2. The method according to claim 1, further comprising:

when the one software container is successfully allocated to the client, removing the one software container from the distributed repository.

3. The method according to claim 1, wherein the distributed repository is based on a distributed hash table.

4. The method according to claim 1, further comprising:

determining if connecting to the one software container was successful; and responsive to connecting to the one software container not being successful, repeating connecting and determining a predetermined number of instances and wherein the software container is determined to fail to be allocated to the client when none of the number of instances of connecting to the one software container results in a successful allocation to the client.

5. A container allocator configured to allocate a software container executing on a server of a set of servers, the container allocator comprising:

a processor; and a memory storing instructions that, when executed by the processor, cause the container allocator to:

receive a request to invoke the software container for a client;

calculate a lookup key associated with the software container;

start a fallback software container in the server of the set of servers to allocate to the client responsive to failing to allocate the software container to the client:

perform a lookup in a distributed repository using the lookup key, giving a result set of software containers that is active, the distributed repository being a distributed peer to peer repository;

select one software container from the result set of software containers;

connect to the one software container to allocate the one software container to the client; and responsive to the one software container failing to be allocated to the client, connect to the fallback software container to allocate the fallback software container to the client.

6. The container allocator according to claim 5, further comprising instructions that, when executed by the processor, cause the container allocator to:

when the one software container is successfully allocated to the client, removing the one software container from the distributed repository.

7. The container allocator according to claim 5, wherein the distributed repository is based on a distributed hash table.

8. The container allocator according to claim 5, further comprising instructions that, when executed by the processor, cause the container allocator to:

determine if connecting to the one software container was successful; and responsive to connecting to the one software container not being successful, to repeat connecting and determining a predetermined number of instances to determine the one software container to have failed to be allocated to the client when none of the number of instances of connecting to the one software container results in a successful allocation to the client.

9. A computer program for allocating a software container executing on a server of a set of servers, the computer program comprising a non-transitory computer readable medium having computer readable program code embodied in the non-transitory computer readable medium, the computer program code which, when run on a container allocator cause the container allocator to:

receive a request to invoke the software container for a client;

calculate a lookup key associated with the software container;

start a fallback software container in the server of the set of servers to allocate to the client responsive to failing to allocate the software container to the client;

perform a lookup in a distributed repository using the lookup key, giving a result set of software containers that are active software containers, the distributed repository being a distributed peer to peer repository;

select one software container from the result set of software containers;

connect to the one software container to allocate the one software container to the client; and responsive to the one software container failing to be allocated to the client, connect to the fallback software container to allocate the fallback software container to the client.

* * * * *